Figure 1:
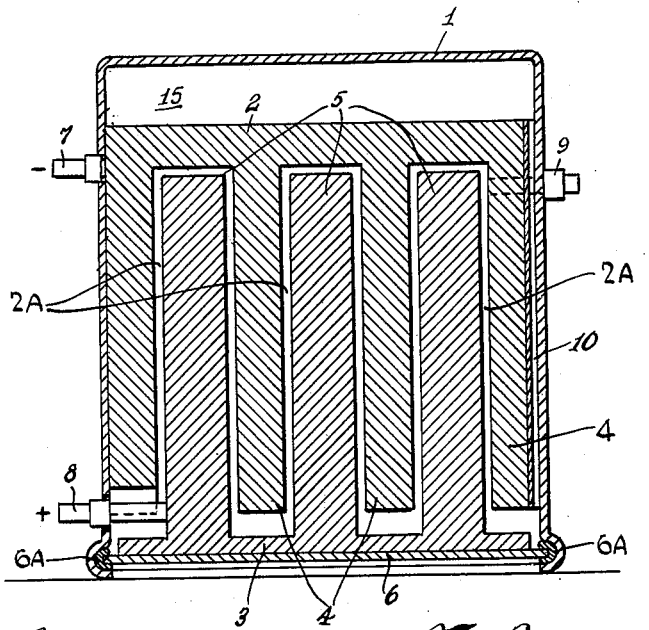

Oct. 14, 1952 — P. A. C. JACQUIER — 2,614,138
SEALABLE STORAGE BATTERY CONSTRUCTION
Filed Aug. 9, 1950 — 3 Sheets-Sheet 1

INVENTOR.
PIERRE A. C. JACQUIER
BY
Kenyon & Kenyon
ATTORNEYS

Oct. 14, 1952 P. A. C. JACQUIER 2,614,138
SEALABLE STORAGE BATTERY CONSTRUCTION
Filed Aug. 9, 1950 3 Sheets-Sheet 2

INVENTOR.
PIERRE A. C. JACQUIER
BY
Kenyon & Kenyon
ATTORNEYS.

Oct. 14, 1952 P. A. C. JACQUIER 2,614,138
SEALABLE STORAGE BATTERY CONSTRUCTION
Filed Aug. 9, 1950 3 Sheets-Sheet 3

INVENTOR.
PIERRE A. C. JACQUIER
BY
Kenyon & Kenyon
ATTORNEYS

Patented Oct. 14, 1952

2,614,138

UNITED STATES PATENT OFFICE 2,614,138

SEALABLE STORAGE BATTERY CONSTRUCTION

Pierre A. C. Jacquier, Paris, France

Application August 9, 1950, Serial No. 178,429
In France January 26, 1950

15 Claims. (Cl. 136—6)

This invention relates to storage batteries of the kind which are closed and sealed to prevent loss of the electrolyte due to the well-known evolution of gases, and more particularly to alkaline storage batteries in which evolved oxygen and hydrogen are absorbed by a chemical reaction with the working electrodes. It has for its object the provision of an improved construction making possible the efficient utilization and control of the evolved gases.

During the operation of alkaline batteries and particularly toward the end of the charging operation, oxygen and hydrogen are evolved on the anode and cathode respectively by electrolytic decomposition of the electrolyte water and collect on the electrodes. If, as is a common practice, these gases are allowed to escape, the electrolyte water is thereby lost and that may in turn lead to other inconveniences. It is therefore advantageous to avoid electrolyte water loss by retaining the evolved gases within the battery in such manner that they will continue to participate in the battery action without permanently depleting the water supply. This of course requires making the battery gas-tight. In such a gas-tight battery, it is possible to retain the gases and cause them to become absorbed or chemically combined with the active materials of the electrodes. Thus, the evolved hydrogen becomes fixed within or absorbed by the nickel superoxide or hydrates of the positive electrode while the oxygen is similarly absorbed or fixed by the cadmium or iron, or a mixture of the two, which constitutes the cathode or negative electrode. The hydrogen is so fixed by virtue of the fact that it reduces the oxides or hydrates of the nickel on the anode, while the oxygen is so fixed by virtue of the fact that it oxidizes the metal constituting the active material of the cathode. These fixation reactions, in effect, constitute a local discharging or self-discharging of the active materials of the electrodes since the reactions are identical with those which occur on normal discharge of the battery. However, this local discharging is compensated by the fact that the charging operation continually regenerates the parts so locally discharged. In theory, it is therefore possible to obtain a state of permanent equilibrium and to continue the charging operation indefinitely.

For various technical reasons it is desirable to employ cathodes having a capacity greater than that of the anodes, in order that there shall be no evolution of hydrogen at the cathode until there has been extensive evolution of oxygen at the anode or at least there shall be a greater rate of oxygen evolution at the anode than hydrogen evolution at the cathode. This practice favors hermetically sealed alkaline storage battery construction for in an alkaline storage battery the absorption or fixation of oxygen by the reduced metal of the cathode occurs at a greater rate than the fixation of hydrogen by the superoxide or hydrate of the anode.

The present invention contemplates a sealed construction in which the oxygen is continuously absorbed by the cathode in such manner that the charge state of the cathode remains substantially constant while the charging operation is in process, so that the hydrogen gas practically never evolves at the cathode. In the storage battery construction, according to the present invention, at least a part of the cathode which is to absorb the oxygen is placed immediately above the anode in such way that the ascending motion of the oxygen in the electrolyte will bring it into direct and immediate contact with that part of the cathode which is to absorb it. Thus, by comparison with known storage battery constructions, the absorption of the oxygen may take place more efficiently because a greater area of the cathode is available for such absorption.

Figure 3:
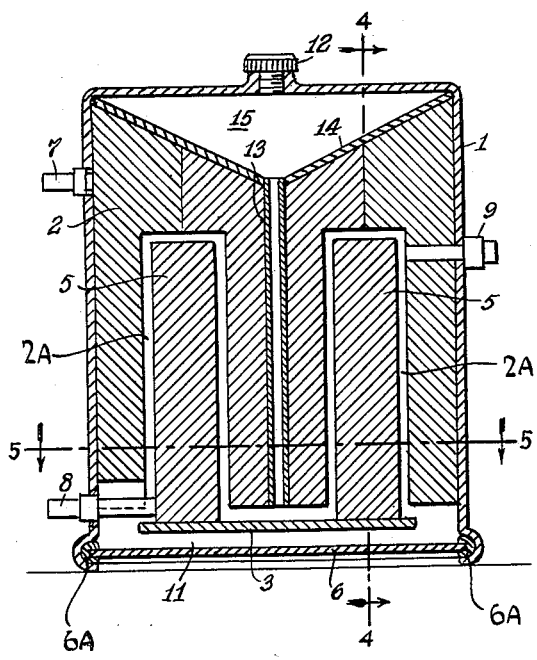
Figure 2:
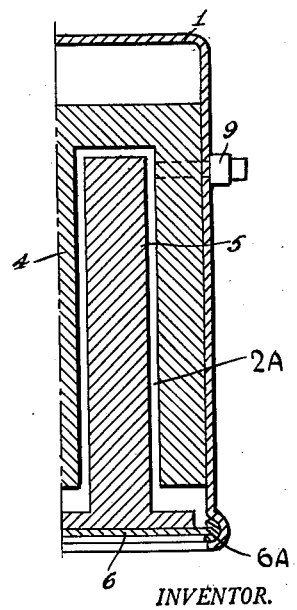
Figure 4:
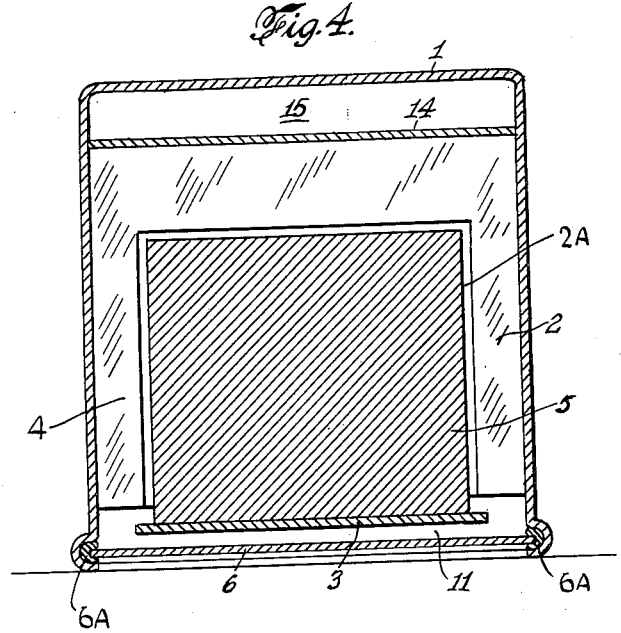
Figure 5:
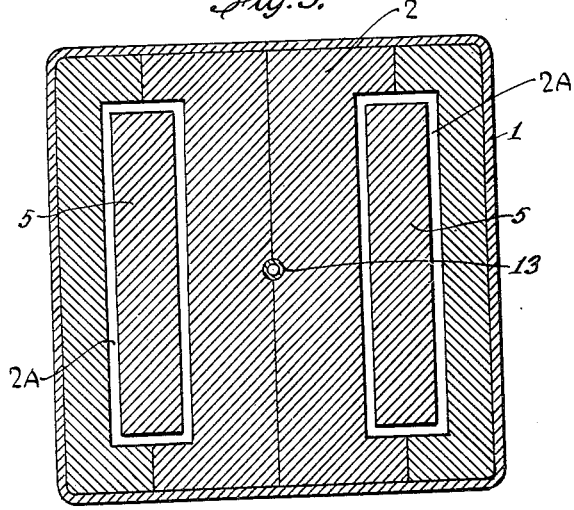
Figure 6:
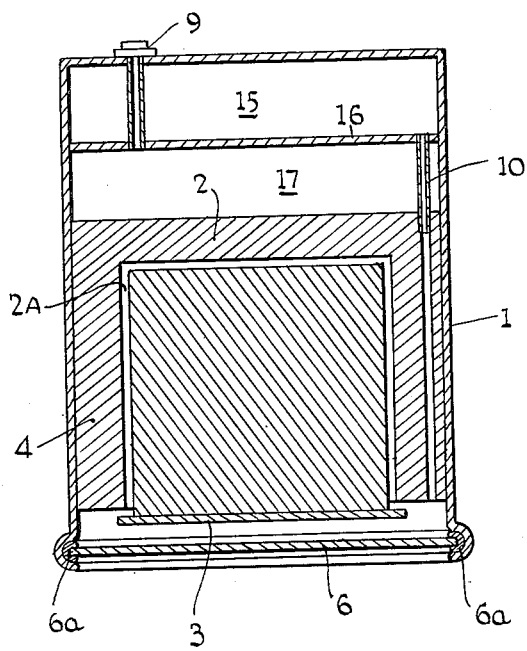

The invention will better be understood by reference to the following description of several embodiments thereof when taken in conjunction with the annexed drawings in which the Fig. 1 illustrates in vertical cross-section a battery embodying the invention; Fig. 2 represents a modification of the Fig. 1 construction; the Figs. 3, 4 and 5 represent still another modification, the Figs. 4 and 5 being respectively vertical and horizontal cross-sections of the Fig. 3 construction along the lines 4—4 and 5—5 of Fig. 3, while the Fig. 6 represents still another modification of the Fig. 1 construction viewed in vertical cross-section transverse to that of Fig. 1. In view of the similarity of elements like numerals have been used to designate like elements throughout the figures of the drawings.

Referring now to Fig. 1, the gas-tight casing or envelope 1, for example of metal, is in direct electrical contact with the block-like cathode structure 2, and has conductively affixed thereto a negative terminal 7 of the battery. The cathode structure may frictionally engage the casing 1 or be solidly affixed thereto by sintering and is constructed with depending wall elements 4 such that its lower surface presents a plurality of downwardly facing cavities 2A into which the anode elements 5 project. The anode elements are electrically interconnected as by means of the lower member 3 integral with them and with that member are insulated from the casing 1 by resting on bottom plate 6 insulated from casing 1 as shown at 6A. The anode structure may be provided with a positive battery terminal 8 insulatingly extending through the casing 1 and into contact with the anode structure as shown. Supports and separators of the usual kind may be used for fixedly positioning the anode and cathode structures from each other.

The cathode block 2, preferably is of a porous construction which may be accomplished by forming it of metal powders, such as iron, nickel or a mixture of both, and sintering at a suitable temperature. The sintered block may be molded in one piece or formed of separate parts which when joined form the cavities 2A. These cavities may be of any suitable shape. Although they are shown of generally rectangular section like those of the Figs. 3, 4 and 5 construction, they may be cylindrical in shape in which case, of course, the anode elements 5 are similarly cylindrical.

The anode may be similarly formed of sintered nickel and impregnated with nickel oxide or hydrate or with a mixture of oxides or hydrates of nickel and cobalt. The cathode block may be filled with active material such as cadmium, iron, a mixture of both, or zinc.

Electrolyte fluid may be introduced by a suitable inlet member 9 normally closing an inlet passage connecting with the space in the cavities 2A between the anode and cathode elements 4 and 5 which electrolyte fluid will impregnate the electrodes and completely fill the cavities. The quantity of electrolyte thus introduced is preferably such that the electrolyte level is near to but slightly below the upper portion of the cathode block, the upper portion being completely impregnated by capillary action.

It will be noted that there is a space or chamber 15 above the cathode and in the upper portion of the casing 1 communicating through a duct 10 with the cavities 2A and space between the anode and cathode elements. Its function will be described below.

Assuming now that a charging operation is in progress, and that the capacity of the anode element is less than that of the cathode element, at the end of the charging operation oxygen is released which collects in the upper portions of the cavities 2A where it is in direct contact with the cathode block which is already charged. This gas will therefore be quickly absorbed by contact with the upper wall and the side walls of the cavities. Eventually the gas will penetrate into the interior of the cathode block because of its porosity. The gas is thus in continuous contact with portions of the cathode and therefore has much opportunity to be absorbed. If the absorption is not complete, the gas may escape to the upper chamber where it is still in contact with the upper portion of the cathode.

If the rate of evolution of the oxygen becomes substantial and greater than the rate of absorption, the pressure generated in the cavities 2A may be great enough to drive the electrolyte level downward and to expel portions of the electrolyte from the cavities 2A through the duct 10 and into the upper chamber 15. The current is thereby partially or completely interrupted depending upon the pressure developed. As the oxygen is absorbed by the cathode at a greater rate due to the increasing surface freed of contact with the electrolyte, the pressure will of course be reduced and the liquid level may again rise inside the cavities by virtue of the return of the electrolyte through the duct 10.

In the Fig. 2 there is illustrated in partial cross section corresponding to the section of Fig. 1, a modification which eliminates the duct 10. In this instance there is no flow of the electrolyte into the upper portion of the battery. Gas which accumulates in the cavities 2A will then increase in pressure without benefit of the releasing action in the form of the upflow of liquid electrolyte into the upper chamber of Fig. 1. In that event, the increased pressure will of course serve to increase the penetration of the oxygen into the porous cavities of the cathode.

In the modification of the Figs. 3, 4 and 5, the duct 13 corresponding to duct 10 of Fig. 1, is positioned centrally and the upper chamber 15 in the upper portion of the casing 1 takes the form of a funnel-like structure 14 formed in the upper portion of the cathode such that the liquid may more readily flow back into the duct 13 on its return path to the space between the anode and cathode when the gas pressure is decreasing even though the battery be not in a vertical position. A space 11 below the anode provides greater electrolyte capacity and circulation. A sealable stopper 12 may be provided for adding electrolyte.

Duct 13 is preferably thin enough that capillary action comes into play and electrolyte may flow through it only when pressure is developed. This will facilitate the operation of the battery in any position during periods other than charging periods.

With a battery constructed in this manner, particularly if the anode and cathode structures are of sintered metal, it is possible at the end of the charging operation to obtain a state of equilibrium between the charge and the discharge for charging rates which in amperes may be as great as $\frac{1}{10}$ or $\frac{1}{7}$ of the storage battery capacity in ampere-hours.

For batteries of more than 5 ampere-hours capacity, the construction illustrated in Fig. 6 may be used to some advantage. Here there is provided in the upper portion of casing or envelope 1 a wall 16 sealed to the casing or envelope 1 so as to provide both the electrolyte receiving chamber 15 and a chamber or space 17 in which gas may collect. Duct 10 connects the cathode cavities with chamber 15. In this case, when gas pressure in the cathode cavities increases, as in the other modifications, the electrolyte is driven into chamber 15 while the evolved oxygen accumulates in chamber 17 after going through the upper portion of cathode structure 2. The gas therefore remains in contact with the upper portion of the cathode structure which absorbs it.

What is claimed is:

1. A sealable storage battery of the kind in which gases evolved are absorbed by at least one of the electrodes comprising juxtaposed first and second electrodes adapted to be immersed at least partially in a body of electrolyte and between which gas is evolved during normal operation, said first electrode in the normal operating position of the battery projecting into the electrolyte and having a portion defining a downwardly opening cavity positioned over at least a portion of the other electrode so as to collect upwardly flowing gas evolved thereon.

2. A battery as in claim 1 in which said first electrode includes at least one cavity opening in the downward face thereof, said second electrode having a portion projecting into said cavity whereby it is substantially surrounded by said first electrode.

3. A battery as in claim 2 in which at least said first electrode is formed of porous metal.

4. A storage battery comprising a casing sealable to prevent escape of gas therefrom and adapted to be filled to a predetermined level with a liquid electrolyte, a first electrode structure within said casing positioned to be immersed at least partially in said electrolyte when said battery is in the normal operating position, said structure defining therewithin at least one cavity having an opening facing toward said electrolyte when said battery is in said position, and an anode structure having a portion projecting into said cavity, whereby gas evolved between said electrodes during operation of said battery may be trapped in said cavity, said first electrode being constituted of material capable of absorbing said gas.

5. A battery as in claim 4 in which at least said cathode structure is formed of porous metal.

6. A battery as in claim 5 including a chamber above said first electrode in which said gas may collect and contact the upper surface of said first electrode.

7. A battery as in claim 4 including an expansion chamber for said electrolyte and a duct means connecting said chamber with said cavity whereby said electrolyte may be forced into said chamber by gas pressure in said cavity.

8. A battery as in claim 7 in which said chamber is positioned above said first electrode whereby upon decrease of said gas pressure due to absorption of said gas by said first electrode, said electrolyte may flow by gravity back to said cavity.

9. A storage battery comprising a casing sealable to prevent escape of gas therefrom and adapted to be filled to a predetermined level with a liquid electrolyte, a first electrode structure within said casing positioned to be immersed at least partially in said electrolyte when said battery is in the normal operating position, said structure defining therewithin at least one cavity having an opening facing toward said electrolyte when said battery is in said position, and an anode structure having a portion projecting into said cavity, whereby gas evolved between said electrodes during operation of said battery may be trapped in said cavity, said first electrode being constituted of a material capable of absorbing said gas, an expansion chamber for said electrolyte and a duct means connecting said expansion chamber with said cavity whereby said electrolyte may be forced into said expansion chamber by gas pressure in said cavity, and a chamber above said first electrode in which said gas may collect and contact the upper surface of said first electrode.

10. A storage battery comprising a metallic casing sealable to prevent escape of gas therefrom and adaptable to be filled to a predetermined level with a liquid electrolyte, a cathode structure within and in tightly fitting electrical contact with the walls of said casing to divide the same into chambers on either side of the cathode structure, said cathode structure being positioned to be immersed at least partially in said electrolyte when said battery is in a normal upright operating position, said cathode structure defining therewithin at least one cavity having an opening facing downwardly toward said electrolyte when said battery is in said position, and an anode structure within and insulated from said casing having a portion projecting into said cavity, whereby gas evolved between said cathode and anode structures during operation of said battery may be trapped in said cavity, at least said cathode structure being constituted of material capable of absorbing gas.

11. A battery as in claim 10 in which at least said cathode structure is formed of porous metal.

12. A battery as in claim 11 in which said porous metal is sintered to said casing.

13. A battery as in claim 10 in which said chamber on the opposite side of said cathode structure from said electrolyte constitutes an expansion chamber for said electrolyte and including a duct means within said cathode structure connecting said chamber with said cavity whereby said electrolyte may be forced into said chamber by gas pressure in said cavity and may flow back to said cavity upon relief of said pressure.

14. A battery as in claim 13 in which said chamber is funnel shaped with its apex directed toward said electrolyte and said duct means is of capillary dimensions whereby to minimize flow of electrolyte between said cavity and chamber other than by gas pressure.

15. A battery as in claim 10 in which said chamber on the opposite side of said cathode structure from said electrolyte includes a wall dividing the same into a first space above said cathode structure in which said gas may collect and contact the upper surface of said cathode structure, and an expansion chamber for said electrolyte, and said battery includes a duct means within said cathode structure connecting said expansion chamber with said cavity whereby said electrolyte may be forced into said expansion chamber by gas pressure in said cavity and may flow back to said cavity upon relief of said pressure.

PIERRE A. C. JACQUIER.

REFERENCES CITED

The following references are of record in the file of this patent:

UNITED STATES PATENTS

| Number | Name | Date |
| --- | --- | --- |
| 1,436,616 | Walsh | Nov. 21, 1922 |
| 2,104,973 | Dassler | Jan. 11, 1938 |
| 2,131,592 | Lange et al. | Sept. 27, 1938 |
| 2,213,128 | Langguth | Aug. 27, 1940 |
| 2,465,202 | Craig | Mar. 22, 1949 |

FOREIGN PATENTS

| Number | Country | Date |
| --- | --- | --- |
| 311,141 | Great Britain | May 9, 1929 |

OTHER REFERENCES

Vinal, Storage Batteries, Third Edition, 1940, John Wiley and Son, Inc., New York, pp 186-193.